(12) United States Patent
Williams

(10) Patent No.: US 12,172,638 B2
(45) Date of Patent: Dec. 24, 2024

(54) DYNAMICALLY MODIFIABLE MAP

(71) Applicant: EMBARK TRUCKS, INC., San Francisco, CA (US)

(72) Inventor: Grady Williams, San Francisco, CA (US)

(73) Assignee: EMBARK TRUCKS, INC., San Francisco, CA (US)

(*) Notice: Subject to any disclaimer, the term of this patent is extended or adjusted under 35 U.S.C. 154(b) by 84 days.

(21) Appl. No.: 17/379,126

(22) Filed: Jul. 19, 2021

(65) Prior Publication Data

US 2023/0016578 A1    Jan. 19, 2023

(51) Int. Cl.
| | |
|---|---|
| *B60W 30/14* | (2006.01) |
| *B60W 10/20* | (2006.01) |
| *B60W 30/18* | (2012.01) |
| *G01C 21/00* | (2006.01) |
| *B60W 10/04* | (2006.01) |
| *B60W 10/18* | (2012.01) |
| *B60W 60/00* | (2020.01) |
| *G05B 13/02* | (2006.01) |

(52) U.S. Cl.
CPC ......... *B60W 30/143* (2013.01); *B60W 10/20* (2013.01); *B60W 30/18163* (2013.01); *G01C 21/3815* (2020.08); *B60W 10/04* (2013.01); *B60W 10/18* (2013.01); *B60W 60/001* (2020.02); *B60W 2420/403* (2013.01); *B60W 2420/408* (2024.01); *B60W 2552/53* (2020.02); *G05B 13/0265* (2013.01)

(58) Field of Classification Search
CPC .................... B60W 30/143; G01C 21/3815
See application file for complete search history.

(56) References Cited

U.S. PATENT DOCUMENTS

| | | |
|---|---|---|
| 9,123,152 B1 | 9/2015 | Chatham |
| 9,280,156 B1 | 3/2016 | Ferguson et al. |
| 2017/0122749 A1 | 5/2017 | Urano et al. |
| 2018/0304891 A1* | 10/2018 | Heidenreich ....... B60W 60/001 |
| 2019/0137287 A1* | 5/2019 | Pazhayampallil ... G05D 1/0291 |
| 2019/0271550 A1 | 9/2019 | Breed et al. |

(Continued)

FOREIGN PATENT DOCUMENTS

| | | |
|---|---|---|
| WO | 2018/126228 A1 | 7/2018 |
| WO | 2021/160319 A1 | 8/2021 |

*Primary Examiner* — Jess Whittington
(74) *Attorney, Agent, or Firm* — McDermott Will & Emery LLP

(57) ABSTRACT

Provided are systems and methods for controlling a vehicle based on a map that designed using a factor graph. Because the map is designed using a factor graph, positions of the road can be modified in real-time while operating the vehicle. In one example, the method may include storing a map which is associated with a factor graph of variable nodes representing a plurality of constraints that define positions of lane lines in a road and factor nodes between the variable nodes on the factor graph which define positioning constraints amongst the variable nodes, receiving an indication from the road using a sensor of a vehicle, updating positions of the variable nodes based on the indication and an estimated location of the vehicle within the map, and issue commands capable of controlling a steering operation of the vehicle based on the updated positions of the factor nodes.

18 Claims, 13 Drawing Sheets

(56) References Cited

U.S. PATENT DOCUMENTS

| | | | |
|---|---|---|---|
| 2020/0018607 A1* | 1/2020 | Balu | H04W 12/02 |
| 2020/0166364 A1 | 5/2020 | Fujita | |
| 2020/0284590 A1 | 9/2020 | Chen | |
| 2021/0157316 A1* | 5/2021 | Liu | G05D 1/0276 |
| 2022/0001872 A1* | 1/2022 | Taieb | B60W 60/0011 |
| 2022/0198935 A1* | 6/2022 | Adams | B60W 60/001 |
| 2022/0227380 A1* | 7/2022 | Griffith | G06T 7/246 |
| 2023/0384115 A1* | 11/2023 | Hempel | G06F 16/55 |

* cited by examiner

FIG. 3B                                    300B
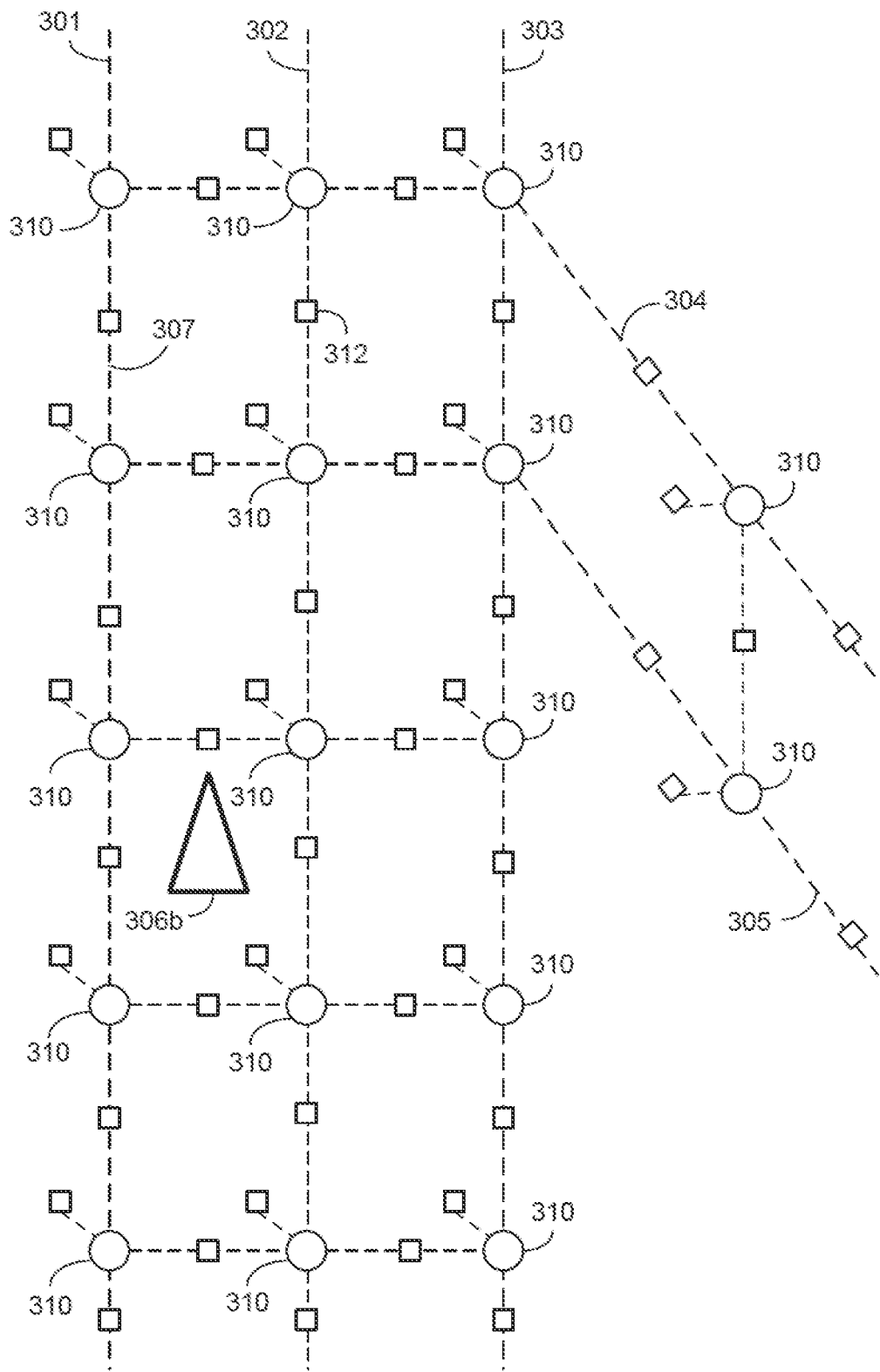

DYNAMICALLY MODIFIABLE MAP

BACKGROUND

An autonomous vehicle relies on its sensors such as cameras, lidars, radars, inertial measurement units (IMUs), and the like, to understand the road and the rest of the world around the vehicle. In addition, the autonomous vehicle may be equipped with or capable of downloading a pre-built map of the world. This map is a virtual map that may be created in a virtual space. The vehicle may capture images and model the features of the road as well as the other objects on the road in the virtual map based on the images. To perform navigation or other operations requiring a sense of direction, the vehicle may localize itself within the virtual map to determine how the vehicle should move in the world, for example, to identify lane changes, changes in velocity, braking operations, and the like.

The pre-built map may be statically defined in certain embodiments. According to the prior art, if there is an error in the map, the error cannot be corrected until after the vehicle has stopped and is powered off and the pre-built map is replaced with a corrected map. These errors can result in problems controlling autonomous vehicle resulting in its leaving a lane unexpectedly, failing to account for unanticipated road conditions, etc. Backup safety mechanisms often exist to allow the vehicle to drive/steer off of a camera centerline rather than the pre-built map. But doing so does not correct the deficiencies in the pre-built map and may introduce issues with other autonomous vehicle that are difficult to resolve. For example, predictions of other objects in the road may be relative to the vehicle's position within map view while the trajectory planning may be relative to a camera centerline view, creating issues with integrating planning and prediction capabilities if the underlying map view has uncorrected deficiencies.

SUMMARY

The example embodiments are directed to a dynamically modifiable map for a vehicle that overcomes the drawbacks of the traditional autonomous vehicle techniques that use a pre-built map. The map may be a three-dimensional view of the world that is modeled by the vehicle or by another entity. The vehicle may localize itself in reference to the map when performing operations such as steering, lane change, turns, object recognition, etc. According to various embodiments, the map may be associated with a plurality of interconnected nodes (e.g., a factor graph, etc.). In such embodiments, nodes may take one of two forms including variable nodes which are quantities to be estimated and factor nodes which define probabilistic relationships on the variable nodes. Within the graph, the nodes may be represented by dots, square, or other shapes and they may be interconnected to one another via undirected edges (lines). The nodes associated with the map may be arranged/modeled in the shape of lane lines of the road on which the vehicle is travelling.

During travel (real-time), the vehicle can capture sensor indications, such as images of the lane lines and compare them to the lane lines in the map. When the vehicle detects a variable node in the map is misaligned with a lane line in an image, the vehicle can change a pose of the variable node within the map and other surrounding variable nodes within the map based on the adjacent factor nodes stored in the factor graph. The pose may include a variable based on both position and orientation within the map. That is, the vehicle can modify/correct inconsistencies with the map on the fly. Thus, if a portion of the lane lines are incorrectly aligned, the vehicle can self-adjust the map on the fly and while moving along the road. Furthermore, the factor graph includes factor nodes between the variable nodes that constrain the relative pose between the variable nodes. When the vehicle moves a variable node in the factor graph, the remaining variable nodes are also moved based on pose constraints stored within the adjacent factor nodes.

According to an aspect of an example embodiment, provided is a computing system that may include a memory configured to store a map which is associated with a factor graph of variable nodes representing a plurality of constraints defining position of lane lines in a road and factor nodes between the variable nodes on the factor graph which define positioning constraints amongst the variable nodes, and a processor configured to receive an indication from the road using a sensor of a vehicle, update positions of the variable nodes based on the indication of the road and an estimated location of the vehicle within the map, and issue commands capable of controlling a steering operation of the vehicle based on the updated positions of the variable nodes in the map.

According to an aspect of another example embodiment, provided is a method that may include storing a map which is associated with a factor graph of variable nodes representing a plurality of constraints that define positions of lane lines in a road and factor nodes between the variable nodes on the factor graph which define positioning constraints amongst the variable nodes, receiving an indication from the road using a sensor of a vehicle, updating positions of the variable nodes based on the indication of the road and an estimated location of the vehicle within the map, and issue commands capable of controlling a steering operation of the vehicle based on the updated positions of the factor nodes in the map.

According to an aspect of another example embodiment, provided is a vehicle that may include a memory configured to store a map which is associated with a factor graph of variable nodes representing a plurality of constraints defining positions of lane lines in a road and factor nodes between the variable nodes which define positioning constraints amongst the variable nodes on the map, and a processor configured to update positions of the variable nodes based on an indication of the road and an estimated location of the vehicle within the map, and store the updated positions of the variable nodes in the map within the memory.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 3A-3C are diagrams illustrating a process of modeling a plurality of lane lines via a factor graph in accordance with an example embodiment.

Figure 1:
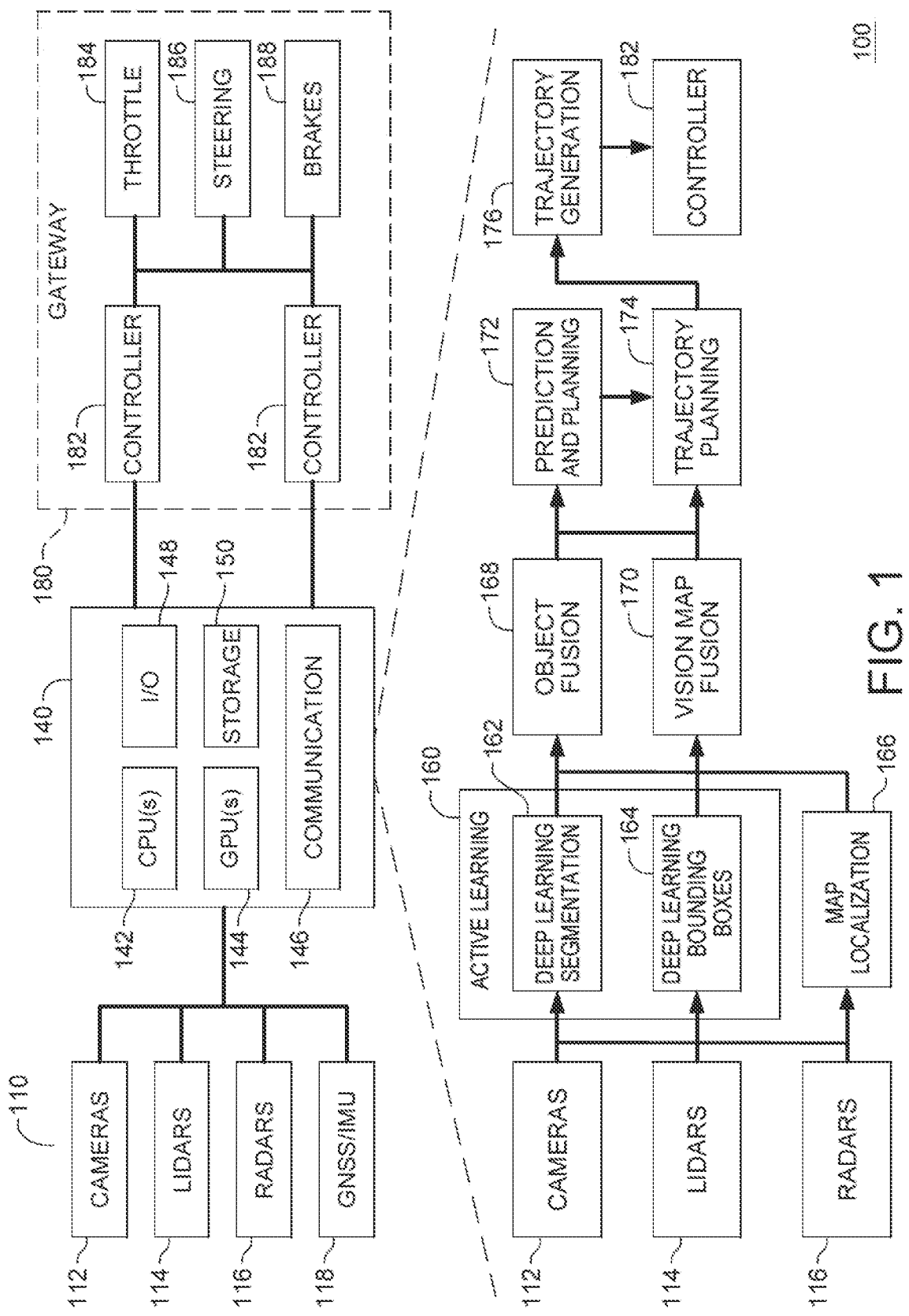
FIG. 1 is a diagram illustrating a control system that may be deployed in a vehicle such as the semi-truck depicted in FIGS. 2A-2C, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. However, it is understood that the scope of the invention is not limited to use within semi-trucks.

Light detection and ranging (lidar) sensors are used by vehicles to measure a surrounding area by obtaining a point cloud using distances to points in the point cloud that are measured by light beams from the lidar sensors. The illumination works independently from ambient light and can be used in any conditions. Furthermore, the lidar sensors can capture data that can be used to generate a map in three-dimensions (3D). Meanwhile, vehicle cameras can capture images (e.g., RGB images, black and white images, etc.) of the world around the vehicle and provide complimentary data to the lidar data captured by the lidar sensors. For example, cameras can capture data such as color, texture, appearance, etc., while lidar is able to capture and model structural aspects of the data.

In many vehicles, the perception of the vehicle is created based on a combination (i.e., jointly) of lidar data from the lidar sensors and image data captured by the cameras. For accurate perception, these two systems must be aligned with respect to each other. Calibration can be performed to align a coordinate frame of a lidar sensor(s) with a coordinate frame of a camera by changing extrinsic parameters such as rotation and translation between the coordinate frames of the lidar sensor and the camera. These extrinsic parameters can be used to fuse information together from the lidar sensors and the image sensors when the vehicle interprets visual data from the road.

The vehicle may be programmed with or capable of downloading an initial version of the three-dimensional map of the world, for example, by default, etc. With the calibrated sensors, the vehicle can capture images and lidar readings of the area surrounding the vehicle and modify the map within a computer of the vehicle (or remotely via a web server) while the vehicle is also moving on the road. The vehicle can localize itself within the map and make decisions on how to steer, turn, slow down, etc. based on other objects, lane lines, entrance lanes, exit lanes, etc. within the map.

According to various embodiments, rather than model the road as a static map, the road (the lane lines) may be modeled using a factor graph in which variable nodes represent lane lines and edges connect variable nodes to factor nodes which encode positioning constraints. The factor graph/nodes may be stored within or associated with a 3D map of the world that is used by the vehicle to perform steering operations, navigation operations, and other decisions. When one variable node in the map is misaligned based on a comparison to a lane line in the image, the variable node in the map can be moved based on the difference between a location of the variable node in the graph and a location of the corresponding position of the lane line in the image. For example, the variable node in the map may be moved to match the location of the lane line in the image. The node can be moved in any direction including up, down, left, right, over, a combination thereof, etc. Furthermore, remaining variable nodes within the map can be dragged/pulled in a same or similar direction based on the factor nodes connected to the variable nodes in the factor graph. Thus, the example embodiments can modify a map of the road on the fly in response to lane line observations from sensors such as cameras and lidars. The process may be iteratively performed thereby repeatedly updating the map one sub-section at a time (e.g., in small areas rather than the entire map at once).

In order to drive effectively, a self-driving or autonomous vehicle needs to have an understanding of where it and surrounding vehicles are located relative to the lane lines on the road. This scene understanding is key to generating effective motion plans, as well as for understanding intentions of other drivers. Typically, this understanding is achieved by localizing the vehicle within the pre-built map of the world. Once localized in the map, the vehicle can obtain a centerline to follow, predict how vehicles will move in the world, and identify merging/lane change scenarios.

One of the drawbacks of relying on a pre-built map is that if there are errors in the map (which should be expected given the scale involved), driving performance can degrade below acceptable levels. For example, significant issues can occur when a vehicle leaves its lane unintentionally due to the map centerline being incorrect. The example embodiments use images captured by a camera of the vehicle to correct/modify map errors in real time. This has the potential to obtain an accurate centerline, without introducing any inconsistencies in the overall scene. Correcting the map on the fly is a simultaneous localization and mapping (SLAM) problem.

Figure 2A:
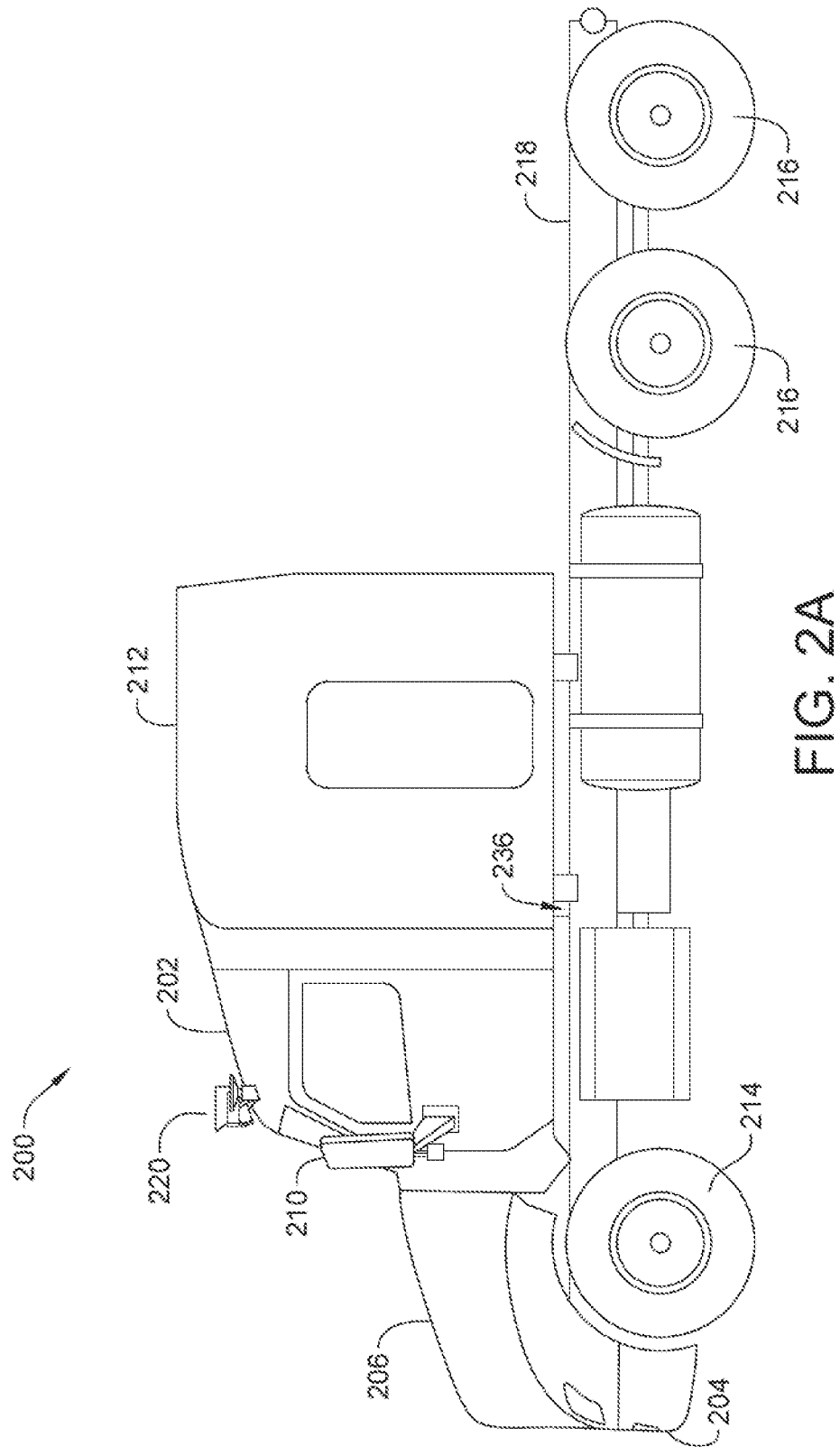
FIGS. 2A-2C are diagrams illustrating exterior views of a semi-truck that may be used in accordance with example embodiments.
Figure 2B:
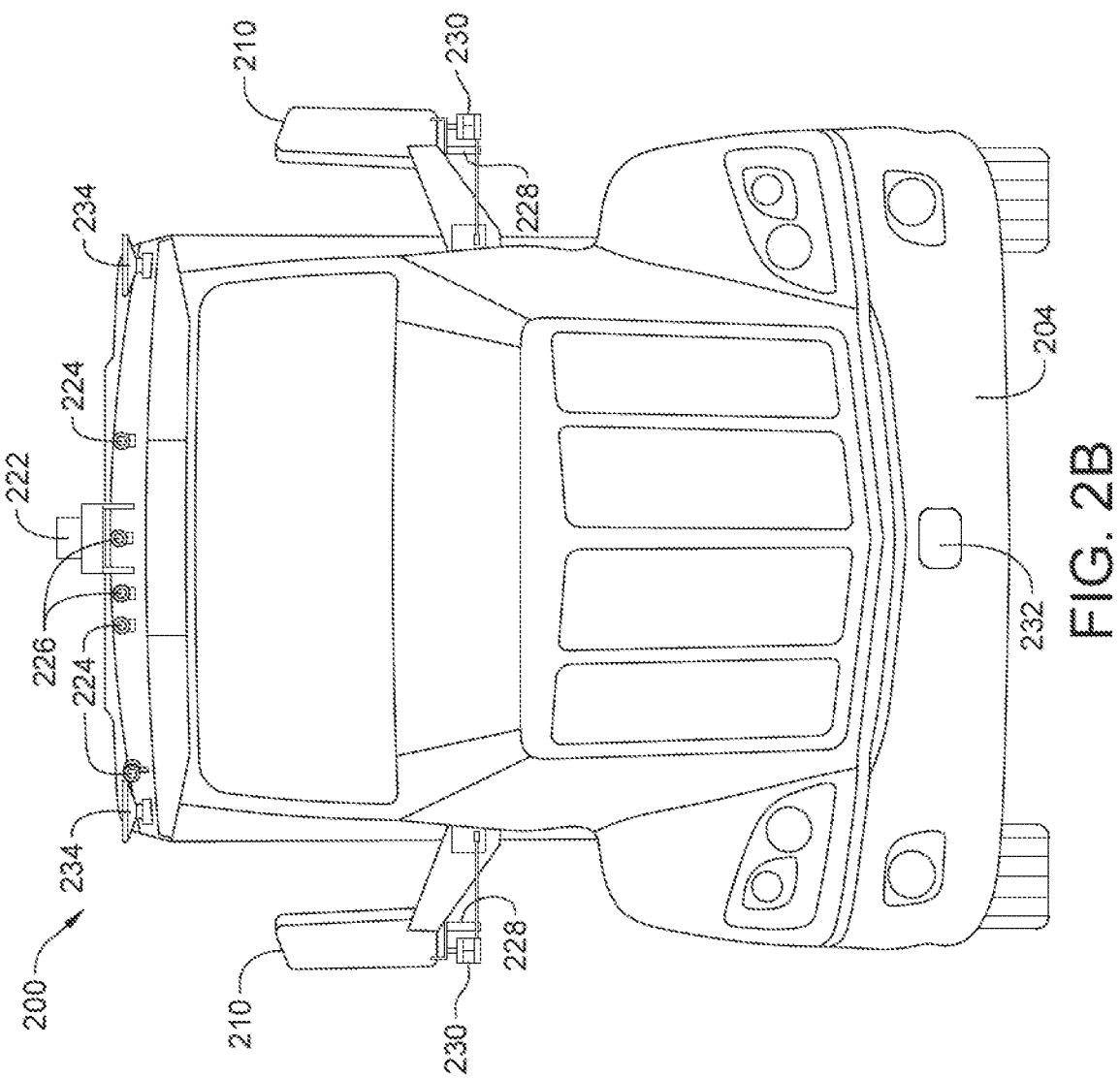
Figure 2C:
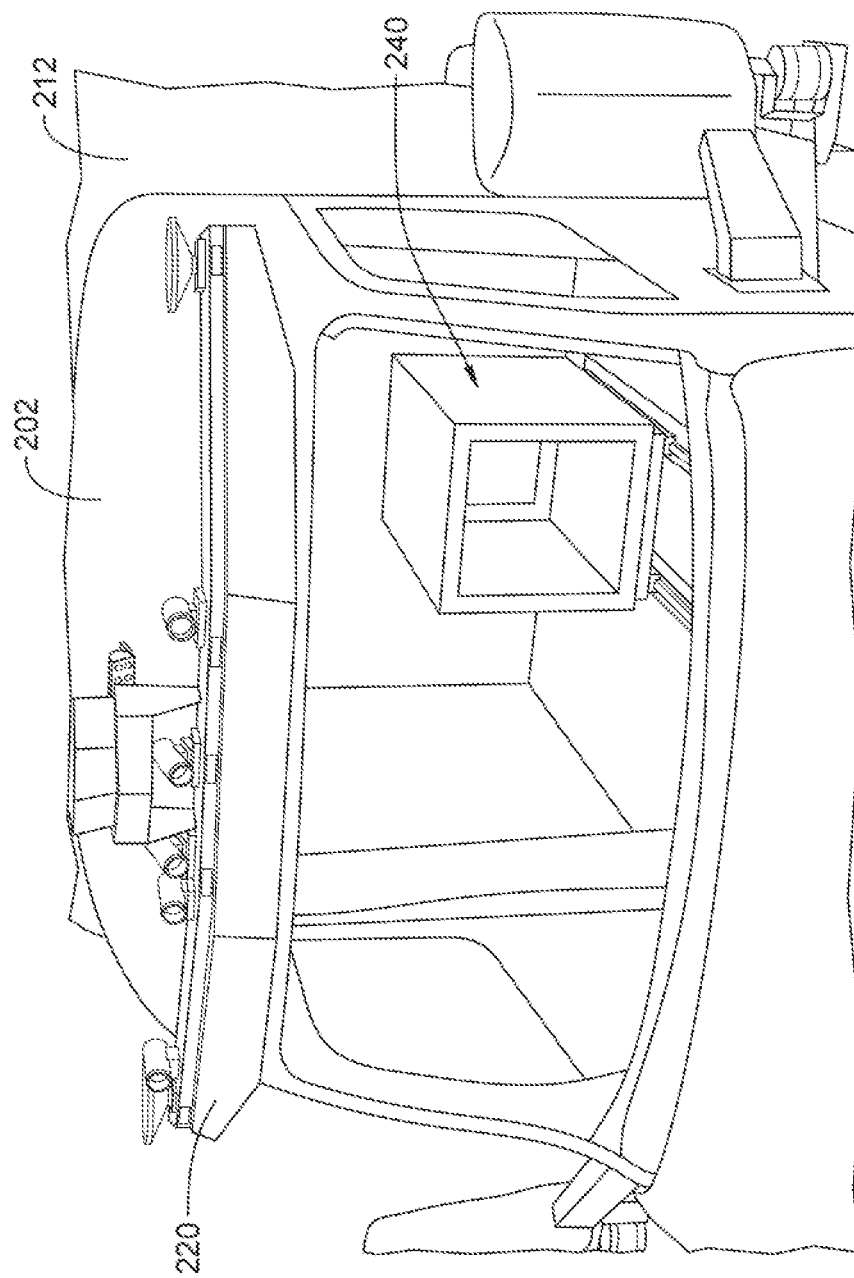

FIG. 1 illustrates a control system 100 that may be deployed in a vehicle such as the semi-truck 200 depicted in FIGS. 2A-2C, in accordance with an example embodiment. Referring to FIG. 1, the control system 100 may include a number of sensors 110 which collect data and information provided to a computer system 140 to perform operations including, for example, control operations which control components of the vehicle via a gateway 180. Pursuant to some embodiments, the gateway 180 is configured to allow the computer system 140 to control a number of different components from different manufacturers.

The computer system 140 may be configured with one or more central processing units (CPUs) 142 to perform processing including processing to implement features of embodiments of the present invention as described elsewhere herein as well as to receive sensor data from sensors 110 for use in generating control signals to control one or more actuators or other controllers associated with systems of the vehicle (including, for example, actuators or controllers allowing control of a throttle 184, steering systems 186, brakes 188 or the like). In general, the control system 100 may be configured to operate the semi-truck 00 in an autonomous (or semi-autonomous) mode of operation.

For example, the control system 100 may be operated to capture images from one or more cameras 112 mounted on various locations of the semi-truck 200 and perform processing (such as image processing) on those images to identify objects proximate or in a path of the semi-truck 200. Further, lidar 114 and radar 116 sensors may be positioned to sense or detect the presence and volume of objects proximate or in the path of the semi-truck 200. Other sensors may also be positioned or mounted on various locations of the semi-truck 200 to capture other information such as position data. For example, the sensors may include one or more satellite positioning sensors and/or inertial navigation systems such as GNSS/IMU 118. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention. The data collected by each of these sensors may be processed by the computer system 140 to generate control signals that control the operation of the semi-truck 200. The images and location information may be processed to identify or detect objects around or in the path of the semi-truck 200 and control signals may be emitted to adjust the throttle 184, steering 186 or brakes 188 as needed to safely operate the semi-truck 200. While illustrative example sensors and actuators or vehicle systems are shown in FIG. 1, those skilled in the art, upon reading the present disclosure, will appreciate that other sensors, actuators or systems may also be used. For example, in some embodiments, actuators to allow control of the transmission of the semi-truck 200 may also be provided.

The control system 100 may include a computer system 140 (such as a computer server) which is configured to provide a computing environment in which one or more software or control applications (such as items 160-182) may be executed to perform the processing described herein. In some embodiments, the computer system 140 includes components which are deployed on a semi-truck 200 (e.g., they may be deployed in a systems rack 240 positioned within a sleeper compartment 212 as shown in FIG. 2C). The computer system 140 may be in communication with other computer systems (not shown) that may be remote from the semi-truck 200 (e.g., the computer systems may be in communication via a network connection).

According to various embodiments described herein, the computer system 140 may be implemented as a server. In some embodiments, the computer system 140 may configured using any of a number of well-known computing systems, environments, and/or configurations such as, but not limited to, personal computer systems, cloud platforms, server computer systems, thin clients, thick clients, handheld or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 140 and the control system 100. For example, as shown, applications may be provided which perform active learning machine processing (active learning component 160) to process images captured by one or more cameras 112 and information obtained by lidar 114. Image data may be processed using deep learning segmentation models 162 to identify objects of interest in those images (such as, for example, other vehicles, construction signs, etc.). Lidar data may be processed by the machine learning applications 164 to draw or identify bounding boxes on image data to identify objects of interest located by the lidar sensors. Information output from the machine learning applications may be provided as inputs to object fusion 168 and vision map fusion 170 software components which may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). These applications allow the control system 100 to be less map reliant and more capable of handling a constantly changing road environment. Further, by correcting any map errors on the fly, the control system 100 can facilitate safer, more scalable and more efficient operations as compared to alternative map-centric approaches. Information is provided to prediction and planning application 172 which provides input to trajectory planning 174 components allowing a trajectory 176 to be generated in real time based on interactions and predicted interactions between the semi-truck 200 and other relevant vehicles in the environment. In some embodiments, for example, the control system 100 generates a sixty second planning horizon, analyzing relevant actors and available trajectories. The plan that best fits multiple criteria (including safety, comfort and route preferences) is selected and any relevant control inputs needed to implement the plan are provided to controllers 182 to control the movement of the semi-truck 200.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 1 illustrates an example computer system 140 which may represent or be integrated in any of the above-described components, etc. FIG. 1 is not intended to suggest any limitation as to the scope of use or functionality of embodiments of the application described herein. The computer system 140 is capable of being implemented and/or performing any of the functionality set forth hereinabove.

The computer system 140 may be described in the general context of computer system-executable instructions, such as program modules, being executed by a computer system. Generally, program modules may include routines, programs, objects, components, logic, data structures, and so on that perform particular tasks or implement particular abstract data types. The computer system 140 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 140 is shown in the form of a general-purpose computing device. The components of the computer system 140 may include, but are not limited to, one or more processors (such as CPUs 142 and GPUs 144), a communication interface 146, one or more input/output interfaces 148 and the storage device 216. Although not shown, the computer system 140 may also include a system bus that couples various system components including system memory to the CPUs 142. In some embodiments, the input/output interfaces 148 may also include a network interface. For example, in some embodiments, some or all of the components of the control system 100 may be in communication via a controller area network ("CAN") bus or the like.

The storage device 150 may include a variety of types and forms of computer readable media. Such media may be any available media that is accessible by computer system/ server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules that are configured to carry out the functions of various embodiments of the application.

FIGS. 2A-2C are diagrams illustrating exterior views of a semi-truck 200 that may be used in accordance with example embodiments. Referring to FIGS. 2A-2C, the semi-truck 200 is shown for illustrative purposes only—those skilled in the art, upon reading the present disclosure, will appreciate that embodiments may be used in conjunction with a number of different types of vehicles. The example semi-truck 200 shown in FIGS. 2A-2C is one configured in a common North American style which has an engine 206 forward of a cab 202, a steering axle 214 and drive axles 216. A trailer (not shown) is attached to the semi-truck 200 via a fifth-wheel trailer coupling that is provided on a frame 218 positioned over the drive axles 216. A sleeper compartment 212 is positioned behind the cab 202. A number of sensors are positioned on different locations of the semi-truck 200. For example, sensors may be mounted on a roof of the cab 202 on a sensor rack 220. Sensors may also be mounted on side mirrors 210 as well as other locations. As will be discussed, sensors may be mounted on the bumper 204 as well as on the side of the cab 202 or other locations. For example, a rear facing radar 236 is shown as mounted on a side of the cab 202 in FIG. 2A. Embodiments may be used with other configurations of trucks or other vehicles (e.g., such as semi-trucks having a cab over or cab forward configuration or the like). In general, and without limiting embodiments of the present invention, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors including a long range lidar 222, long range cameras 224, GPS antennas 234, and mid-range front facing cameras 226. The side mirrors 210 may provide mounting locations for rear-facing cameras 228 and mid-range lidar 230. A front radar 232 may be mounted on the bumper 204. Other sensors may be mounted or installed on other locations—the locations and mounts depicted in FIGS. 2A-2C are for illustrative purposes only. Referring now to FIG. 2C, a partial view of the semi-truck 200 is shown which shows an interior of the cab 202 and the sleeper compartment 212. In some embodiments, portions of the control system 100 of FIG. 1 are deployed in a systems rack 240 in the sleeper compartment 212, allowing easy access to components of the control system 100 for maintenance and operation.

Figure 3A:
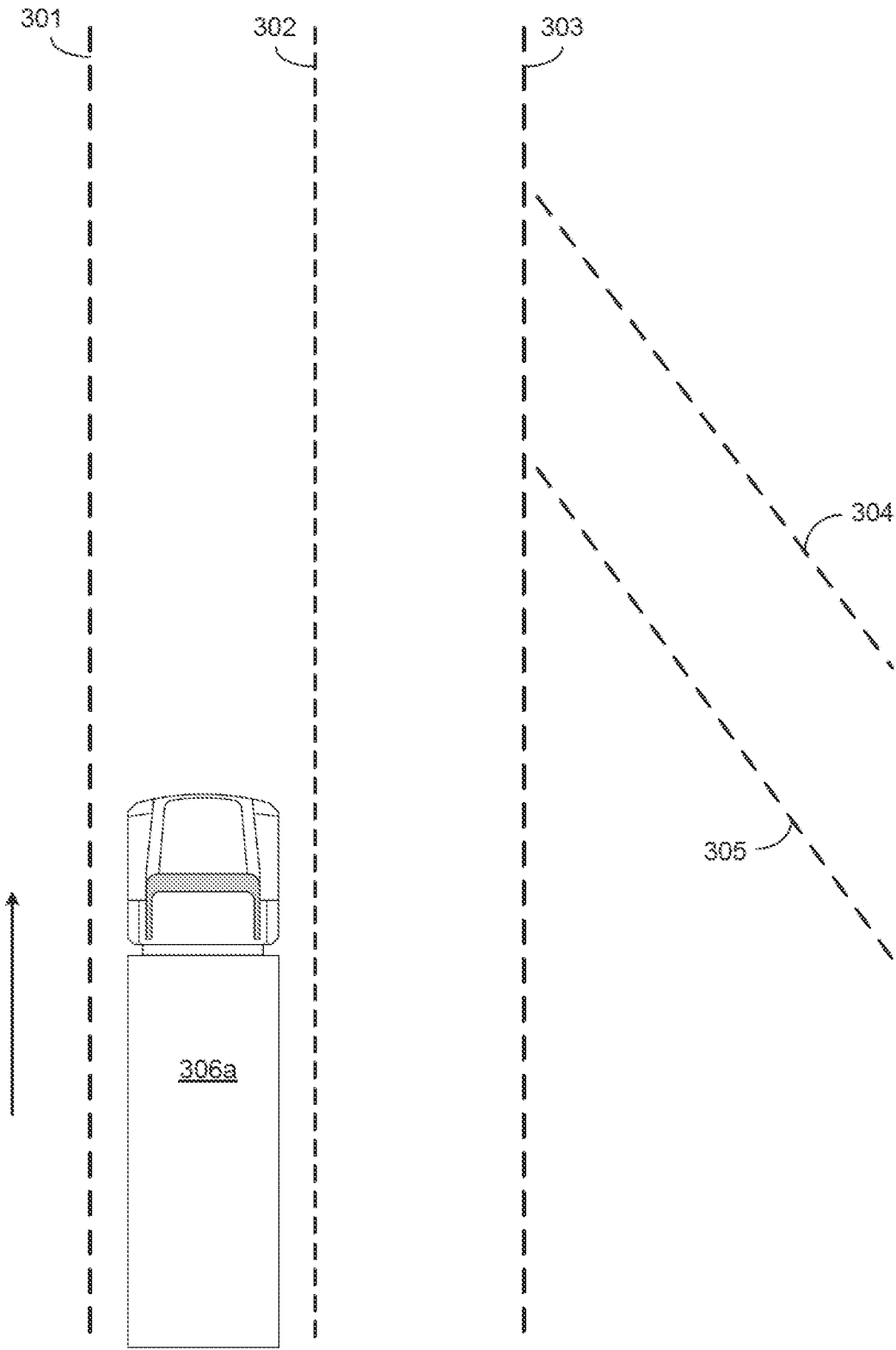
Figure 3C:
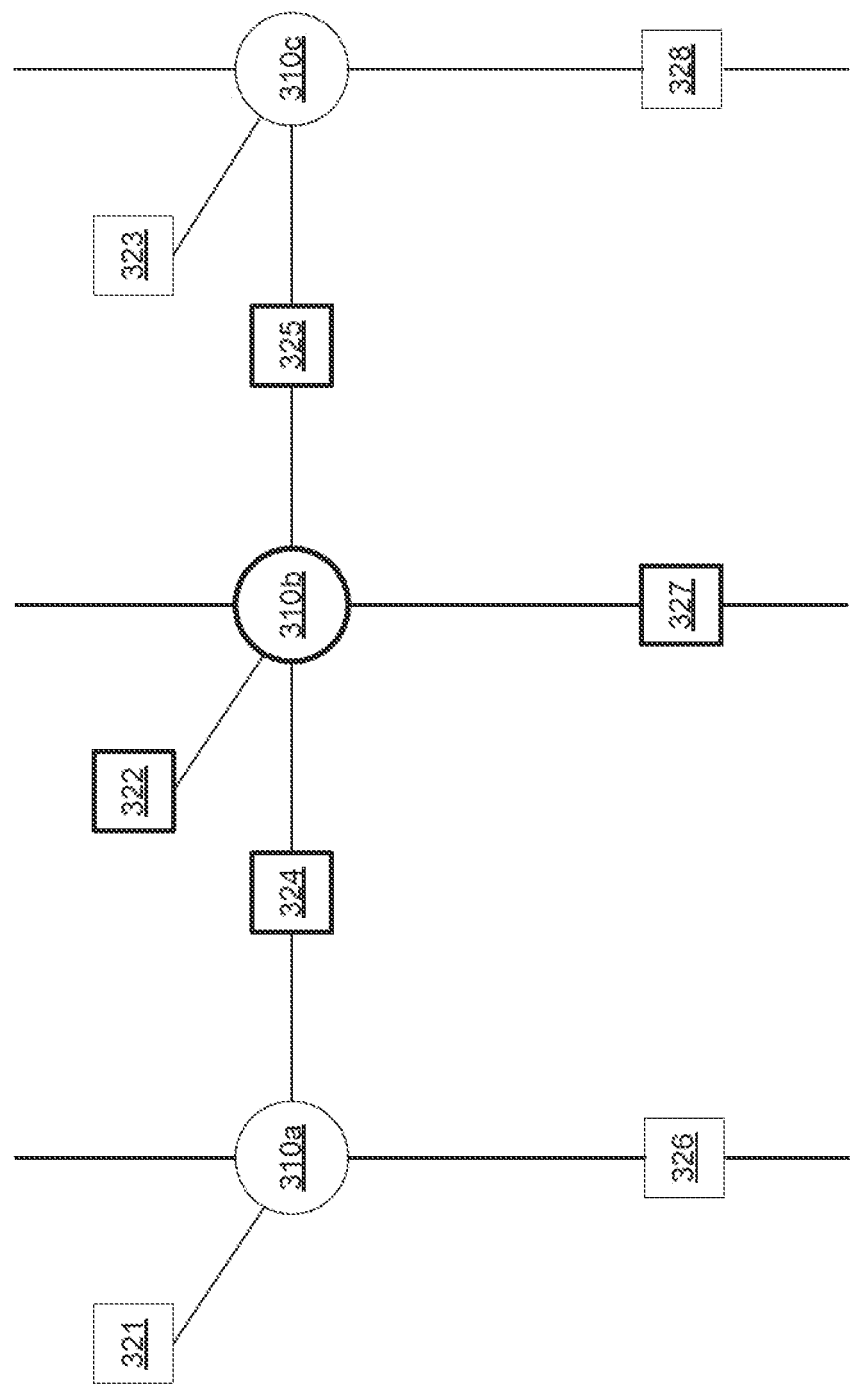

FIGS. 3A-3C illustrate a process of modeling a plurality of lane lines via a factor graph in accordance with an example embodiment. For example, FIG. 3A illustrates a view 300A of a road including lane lines 301, 302, and 303 on which a vehicle 306a is travelling. Here, the road also includes lane lines 304 and 305 that correspond to an entry ramp onto the road. The view 300A is meant to represent the physical/real world.

Meanwhile, FIG. 3B illustrates a view 300B of a digital rendering/map of the world corresponding to the view 300A of the road shown in FIG. 3A, according to various embodiments. Furthermore, reference item 306b represents the vehicle after it has localized itself within the digital map. Referring to FIG. 3B, a multi-dimensional design of the road may be built using a factor graph. Here, the map may include a plurality of variable nodes 310 that are arranged in positions of lane lines 301-305. In addition to the variable nodes, the map also includes edges 307 (or lines) interconnecting the variable nodes to factor nodes 312 that specify positioning constraints between the different variable nodes. The factor nodes 312 may store positioning constraints that limit a position of a variable node based on factor nodes that are connected on the edges 307 or form interconnections between the variable nodes 310.

Factor graphs are bipartite graphs which consist of variables (quantities to be estimated) and factors (probabilistic relationships between variables). Some of the benefits of modeling the map using a factor graph approach is that once the factor graph is created, inference can be done via a sparse non-linear optimization problem.

The factor graph for this problem has three distinct components including the map portion, vehicle chassis, and cab poses, and the factor nodes between the map and cab poses via camera lane lines. The system may estimate both of the vehicle chassis and cab poses. The chassis pose is the pose of mid-point on the rear axle. At rest, the cab pose is the same as the chassis pose, but during motion it can move/rotate slightly compared with the chassis pose.

FIG. 3C illustrates a view 300C of small section of the map portion of the factor graph. Here, the map portion may be represented by a set of nodes 310a, 310b, and 310c which are parallel to one another in the map and which define lane lines 301, 302, and 303, respectively. Lane centerlines may not be computed as part of the optimization, however once the lane lines 301-303 are computed it is relatively simple to compute the centerline. The lane lines 301-303 are boundary lines within the road that are typically shaped in the form of lines or broken/spaced-apart lines. Other types of lane lines include entry ramps, exit ramps, cloverleaf turns, and the like.

The variable nodes 310a, 310b, and 310c, may be represented with a three-dimensional pose with two types of factor nodes attached to them. For example, a global position factor 321, 322, and 323 may be attached to the variable nodes 310a, 310b, and 310c, respectively. These are obtained from the initial map and impose unary constraints on the position of the nodes. This helps keep the variable node in its global position with respect to the other variable nodes during modification of the map. In addition, the map also includes factor nodes 324, 325, 326, 327, and 328 which encode relative pose constraints between the variable nodes. These factor nodes 324-328 connect the lane line nodes together and the pose constraints ensure consistency in distance and orientation between the nodes when one node is moved. In this case, the map drags the remaining variable nodes based on the movement and/or orientation using the pose constraints that are stored in factor nodes 324-328. The pose constraints may restrict spatial changes between the variable nodes within the map. Thus, when one variable node is moved, the remaining variable nodes may be moved based on the pose constraints.

In addition to optimizing the variable nodes 310, the vehicle may also optimize over additional camera poses as well. The reason for this is that the lane line estimate does not compute roll, pitch, and yaw of the cab motion with respect to the map, therefore the vehicle does not have an accurate estimate of the extrinsic camera calibration. Therefore, it can be included into the optimization (this is what turns this from a mapping problem to a SLAM problem).

Referring again to FIG. 3A, the vehicle 306a can capture images of the road including the lane lines 301, 302, 303, 304, and 305, and use the images to modify the map shown in FIG. 3B which may be a default map of the world.

Figure 4A:
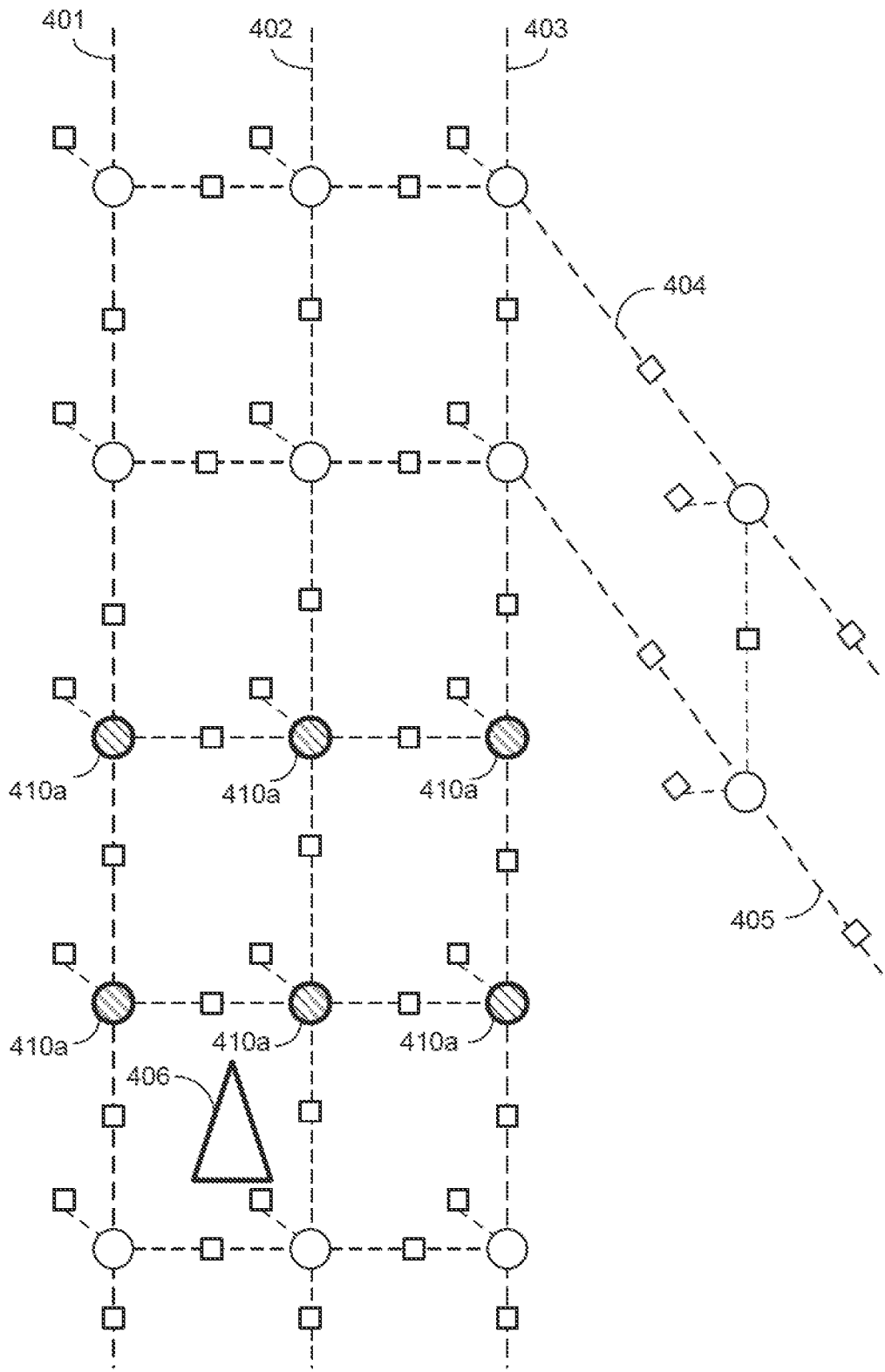
FIGS. 4A-4B are diagrams illustrating a process of iteratively capturing images of lane lines and performing an alignment comparison in accordance with an example embodiment.
Figure 4B:
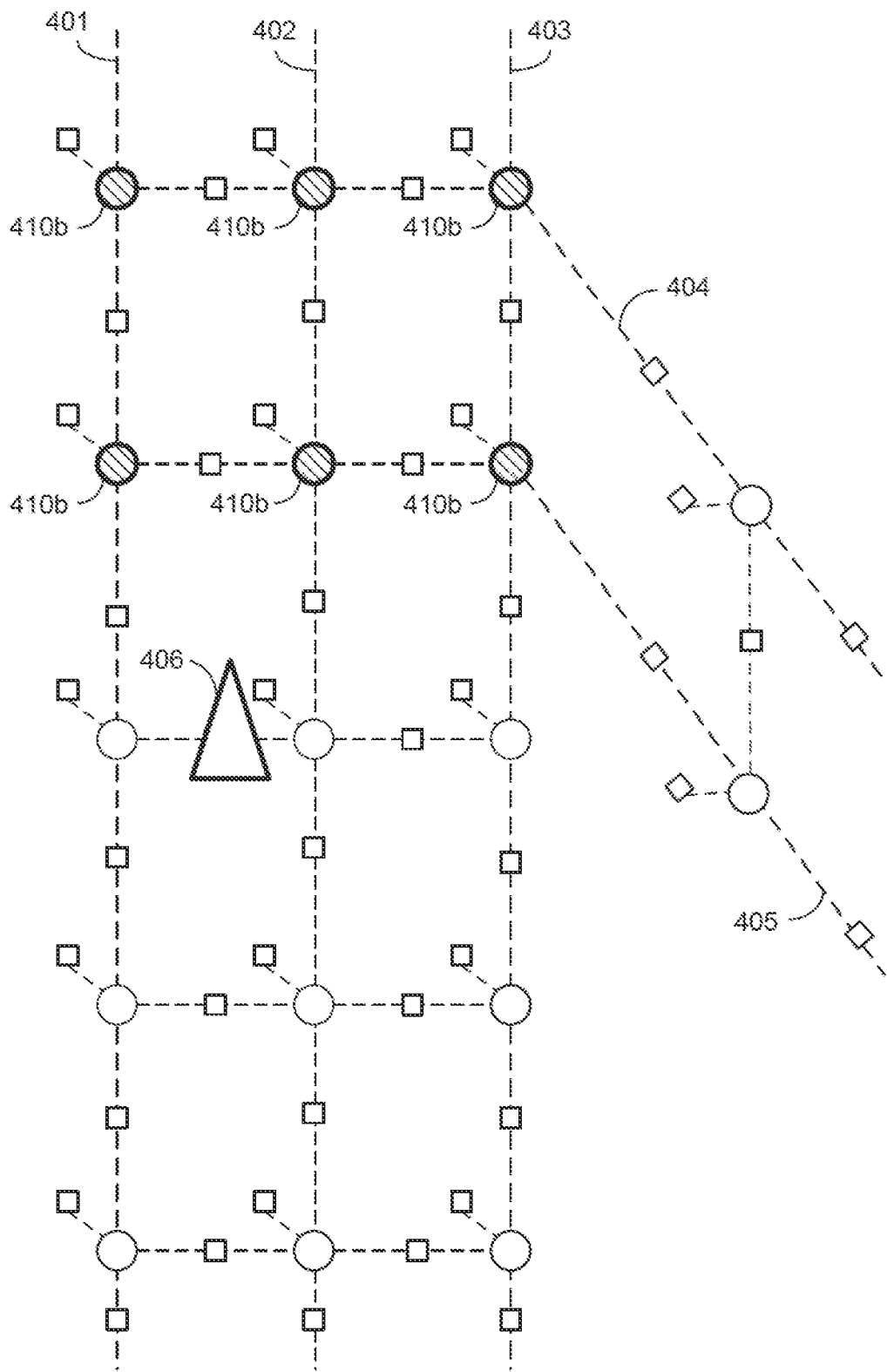

Meanwhile, FIGS. 4A-4B illustrate views 400A and 400B, respectively, of a process of activating variable nodes within the map of lane lines 401, 402, 403, 404, and 405, and performing an alignment comparison in accordance with an example embodiment. That is, FIGS. 4A and 4B illustrate two different intervals of variable nodes that are compared for alignment with images of lane lines that are captured by a vehicle. Here, the vehicle may localize itself within the map as icon 406. Each image may correspond to a subset of variable nodes on the map which are selected/activated for lane line comparison.

In FIG. 4A, a subset of variable nodes 410a are selected for comparison. Here, the vehicle may capture an image of actual lane lines (not shown) and project the subset of variable nodes 410a into the image of the actual lane lines and compare the locations of the subset of variable nodes 410a with the actual lane lines. By only working off of a subset of the variable nodes, a significant amount of computational time and effort can be conserved in comparison to performing an alignment comparison of the entire map at each interval.

Meanwhile, in FIG. 4B, a subset of variable nodes 410b are selected for comparison. Which nodes are activated/compared may be determined based on a location of the vehicle 406 within the map and a position of the lane lines in front of the vehicle. For example, the vehicle may compare the alignment of lane lines up to 75 meters in front of the vehicle, etc. The process may be iteratively repeated as the vehicle goes down the road identify any inconsistences between the map stored locally on the vehicle 406 and the lane lines in the images captured by the camera of the vehicle 406.

In the examples herein, the vehicle may project the variable nodes of a factor graph-based map stored in a 3D model of lane lines onto images of the actual corresponding lane lines within a 2D image, and compare a location of the variable nodes to the actual location of the lane lines in the image. For example, the vehicle's computer may convert the three-dimensional lane lines included in the map into the two-dimensional space of an image of the lane lines and compare a location of the two. As another option, the vehicle's computer may convert the two dimensional lane lines in the image into the three-dimensional space of the map and perform the comparison in the three-dimensional space. If at any time, a misalignment is detected between the lane lines in the image and nodes on the map, the vehicle may update the map as further described in the process of FIGS. 5A-5C. For example, the vehicle's computer may move a position/location of a node in the map of the lane lines to line up with a lane line in the image.

Another component of the factor graph links the cab poses to the nodes in the map via observed camera lane lines. Based on the current cab estimate, the vehicle can determine which lane boundary nodes in the map should be visible in the camera frame and therefore "active" in that iteration of the optimization. It then tries to match these "active" map lane lines with the observed camera lane lines, and creates factor nodes which are minimized when the two lines are in alignment with each other. Determining which lines should match is not part of the probabilistic optimization, and therefore a potentially brittle component of the optimization.

If the vehicle makes an incorrect association, it may introduce non-gaussian errors into the optimization. To prevent occurrence of incorrect associations from destabilizing the optimization, the vehicle may use a noise model based on a Huber norm which can be robust to outliers, instead of a gaussian noise distribution.

Once the active lane boundary nodes are selected, the vehicle may create a factor node which encodes an error based on the observed lane boundaries in the camera frame (i.e., the reprojection error). The projection into the camera frame requires the camera pose (variable node to be optimized), the lane boundary location (variable node to be optimized), and the intrinsic camera calibration (assumed to be known). The error may be computed once the lane boundaries are projected into the camera frame. For example, a linewise association may be used to detect error. In this example, an initial guess of the cab pose and map lane boundary point may be set or otherwise computed to be the closest camera lane line. The vehicle may then minimize the distance from the projected map lane boundary point to the selected line (by recomputing the closest point on the line at each iteration).

Solving this problem from scratch at every time instance may be undesirable because it can be computationally wasteful and discard information obtained from previous time instances that can help refine the map and protect against spurious camera lane line observations. To address this, the vehicle may use incremental smoothing and mapping (specifically ISAM2) to incrementally update the map every time a new camera lane line observation is received. By doing this, the system is able to adjust the map based on many different camera observations, and should be able to produce a higher quality solution than individual static optimizations. ISAM2 is part of GTSAM and is efficient at performing incremental updates.

Figure 5A:
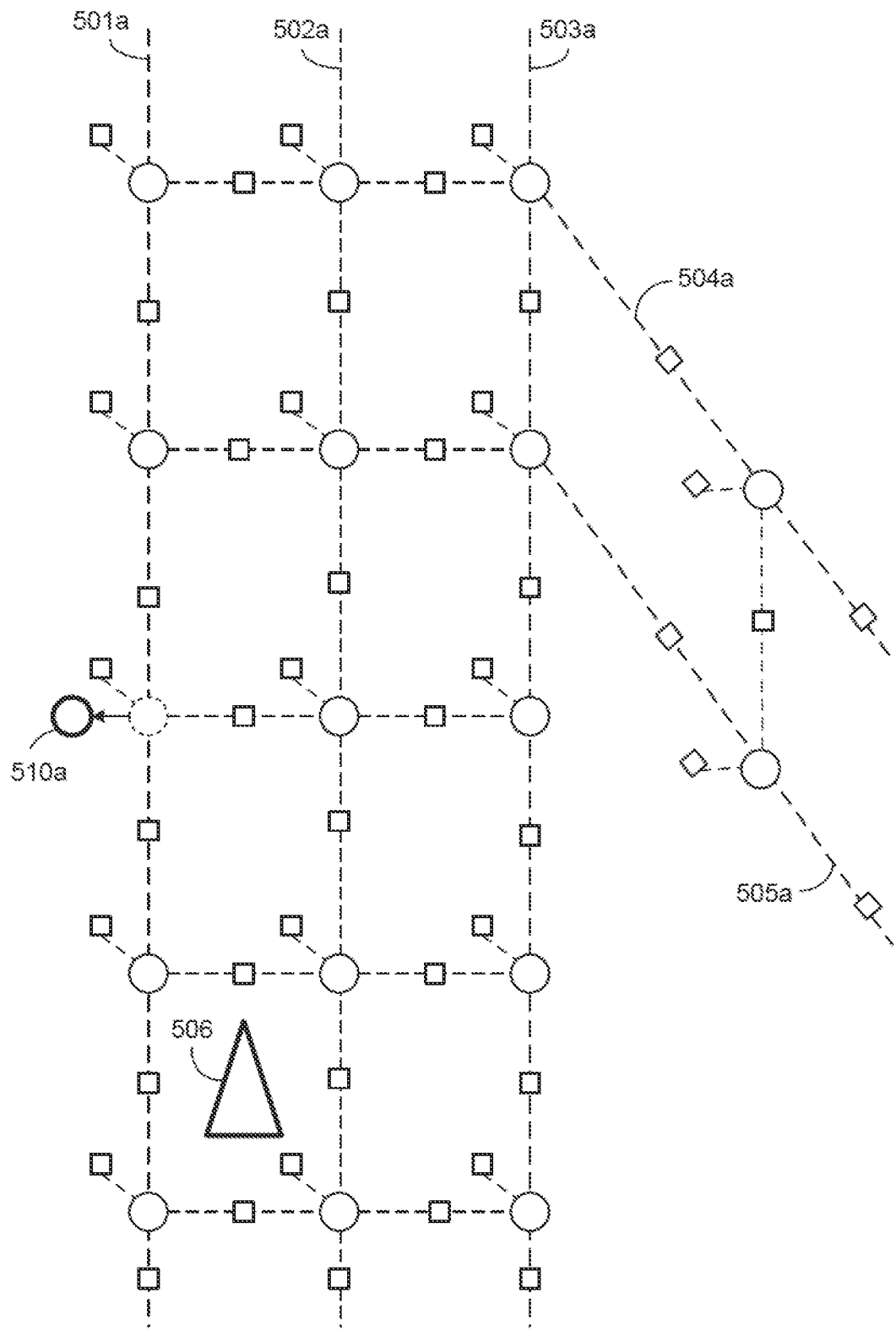
FIGS. 5A-5C are diagrams illustrating a process of modifying locations of lane lines within a map of the road in accordance with an example embodiment.
Figure 5B:
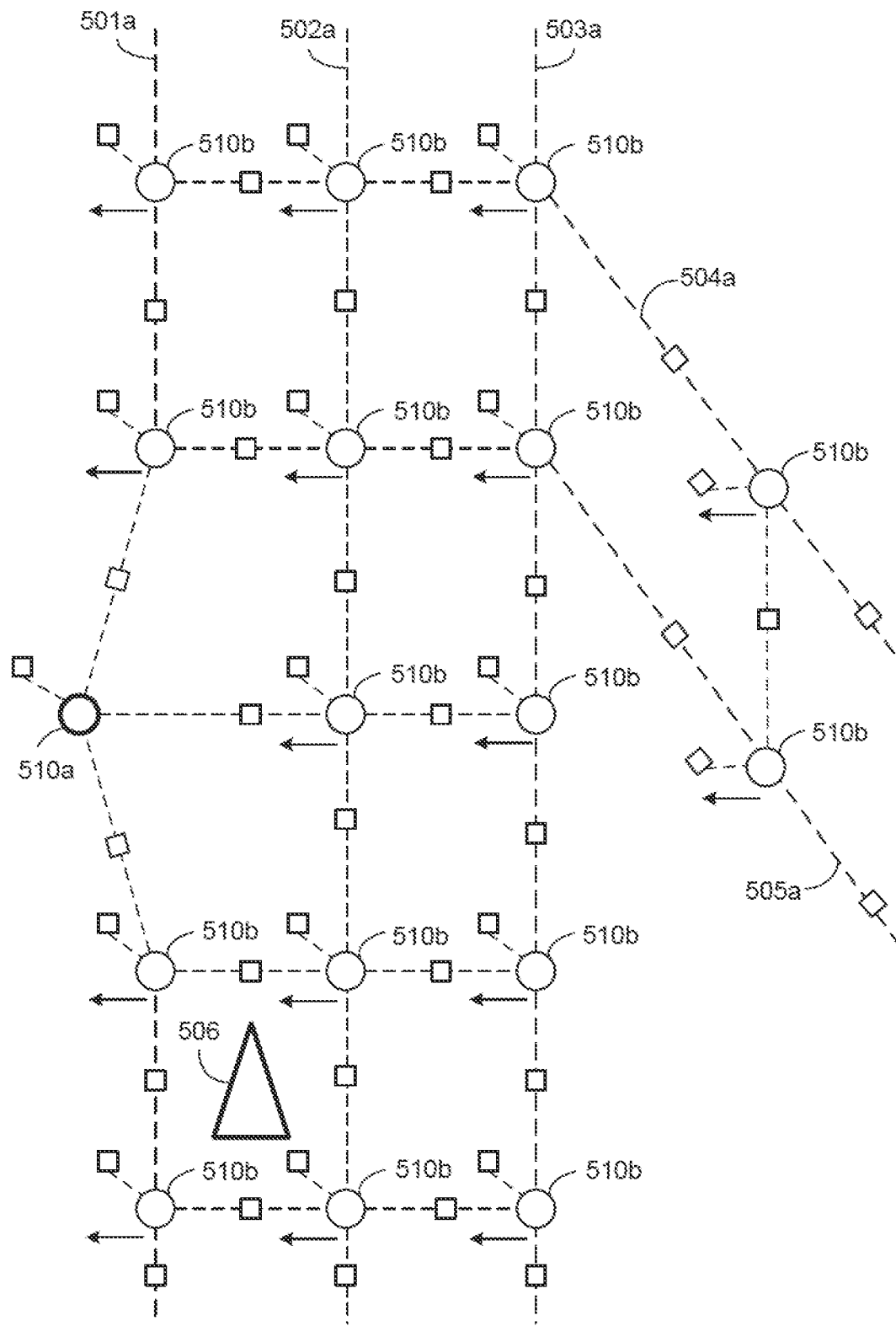
Figure 5C:
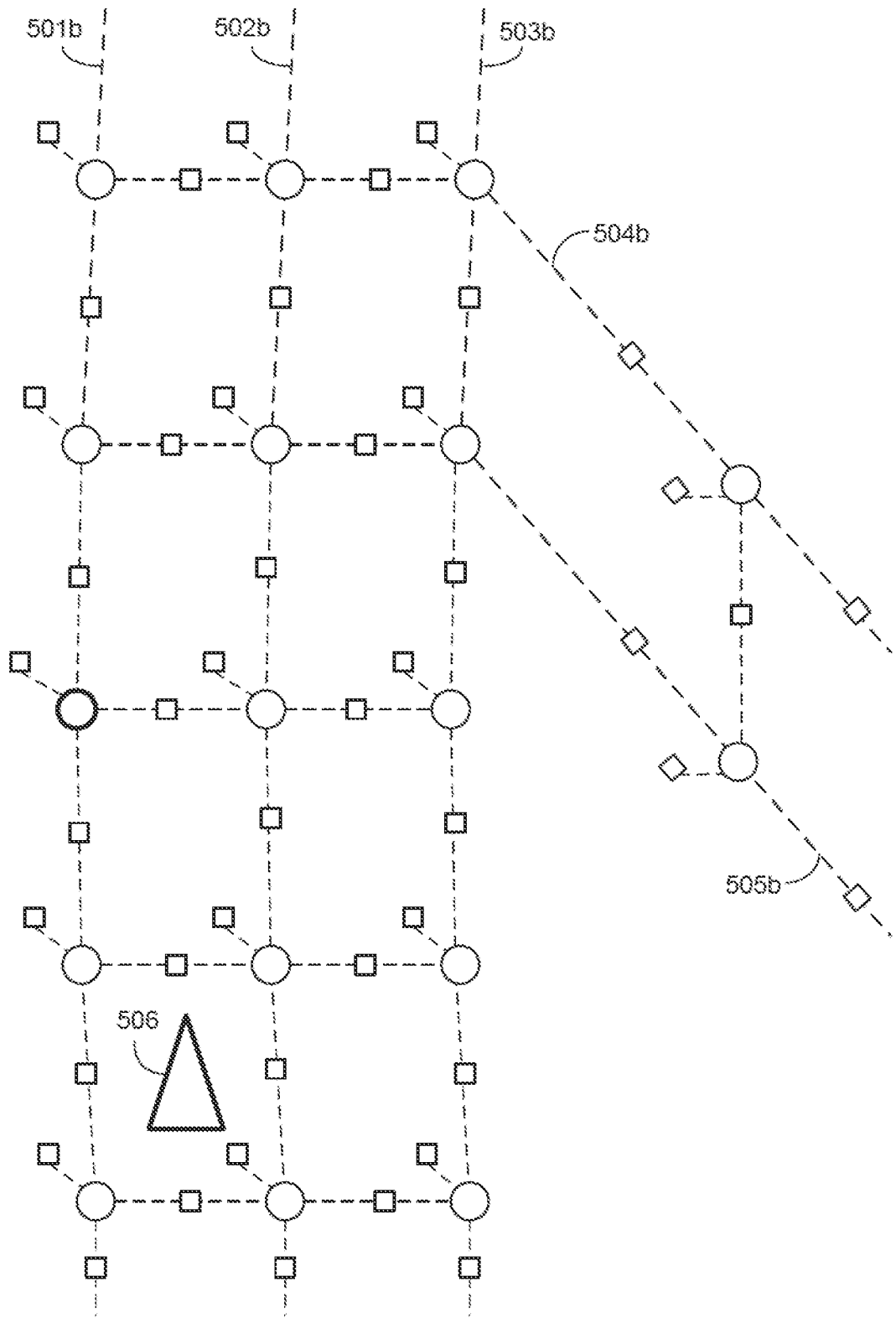

FIGS. 5A-5C illustrate a process of modifying locations of lane lines within a map of the road in accordance with an example embodiment. Referring to FIG. 5A, a view 500A of the map of the virtual world (3D world) is shown. The vehicle may also localize itself within the map as indicated by reference item 506. In this example, the map includes a plurality of variable nodes and factor nodes (referred to as a factor graph) that are arranged in the shape of lane lines 501a, 502a, 503a, 504a, and 505a that are projected into an image of the road.

During operation, the vehicle may project the variable nodes of the lane lines 501a, 502a, 503a, 504a, and 505a, located at initial positions in the map into an image of the lane lines (not shown) captured by the vehicle. Here, the vehicle may compare the position of the variable nodes from the projected lane lines to indications of the observed lane lines captured in the image (or other sensor data such as lidar, radar, etc.) If a node is misaligned, the vehicle may modify the node in the map. Here, the sensor data may be an indication from the road indicating that the lane line in the map is out of alignment with the actual lane line in the road. The indication may be in the form of an image, a lidar data reading, a radar data reading, or the like.

Referring again to FIG. 5A, the vehicle may determine that a target variable node 510a is misaligned based on a comparison of a position of the target variable node 510a in the map to a lane line projected into an image (not shown) received by the vehicle (e.g., as described in the examples of FIGS. 4A-4B). Here, the vehicle may detect that the target variable node 510a does not match a location of the lane line in the image by projecting the target variable node 510a (and it position) into the image and performing a distance comparison. In response, the vehicle may modify the map by moving the target variable node 510a over to the left as shown by the arrow in FIG. 5A.

FIG. 5B illustrates a view 500B of remaining variable nodes 510b surrounding the target node 510a in the map. Referring now to FIG. 5B, remaining variable nodes 510b (i.e., other nodes in the map besides the target node 510a) can be moved based on the transforms that are stored in the factor nodes (squares) of the factor graph. As shown in FIG. 5B, the remaining variable nodes 510b that surround the target variable node 510a, may each be moved in a similar direction as the target variable node 510a based on the factor nodes that are stored on the interconnections (lines, edges, etc.) between the target variable node 510a and the remaining variable nodes 510b. These factors limit or otherwise constrain the distance apart that two nodes can be. In some embodiments, each pair of variable nodes in the map may have a factor node positioned on the edge between them. These factor nodes can be used by the vehicle to determine how much to move the other variable nodes. In many cases, the amount may be the same or approximately the same. FIG. 5C shows a view 500C of the map after all of the remaining nodes 510b have been moved as well. In addition, the lane lines 501a, 502a, 503a, 504, and 505a that are initially projected into the image can be used to update the map as indicated by modified lane lines 501b, 502b, 503b, 504b, and 505b.

According to various embodiments, a vehicle includes a dynamically modifiable map that can be driven off of before and after modification. The map can have different formats. For example, the map may be stored as a JavaScript Object Notation (JSON) file, a C++ file, or the like. In some embodiments, the vehicle may convert the map from one format to another before making changes to the map, and then convert the map back to its original format. For example, the vehicle may convert the map from a JSON format to a Robotic Operating Systems (ROS) format, then convert the ROS format into a C++ format and make the changes to the C++ file, and convert the C++ file back into ROS format for use during operation of the vehicle.

In some embodiments, an initial map may be stored in the vehicle's computer. The initial map may be a default map with a sparse set of points on the line. Over time, the vehicle can begin filling-in the map with additional more densely populated data points as the vehicle travels the world and makes changes to the map. For example, the vehicle may capture an image every 5 meter, 10 meters, etc., of the road within a predetermine distance (e.g., 60 meters in front of the vehicle/camera, etc.), plus anything that is split into/out of the road. Each interval, the vehicle may update a subsection of the map.

It can be difficult to match something in 3D such as the lane lines to a camera measurement which is in 2D. There is no immediate way to take the camera lane line and say where that is in 3D. Instead, the vehicle may take the 3D point and project it into the camera image frame (2D) and then compute the error in the camera frame which is referred to as reprotection error (standard error metric in computer vision and robotics).

Once a target variable node is identified for modification, the locations of the remaining variable nodes can also be modified based on the factor nodes. Inside some of the factor nodes is a transform function that is stored identifying pose constraints between the variable nodes (how tight the transform is, and what the transform is specified ahead of time). In addition, there is also a factor node that stores global positioning information of the node with respect to all other nodes in the map. The global position information may identify a lane line, adjacent nodes in all directions, etc. Furthermore, each node may be labelled with an identifier of the lane line that it is associated with.

Figure 6:
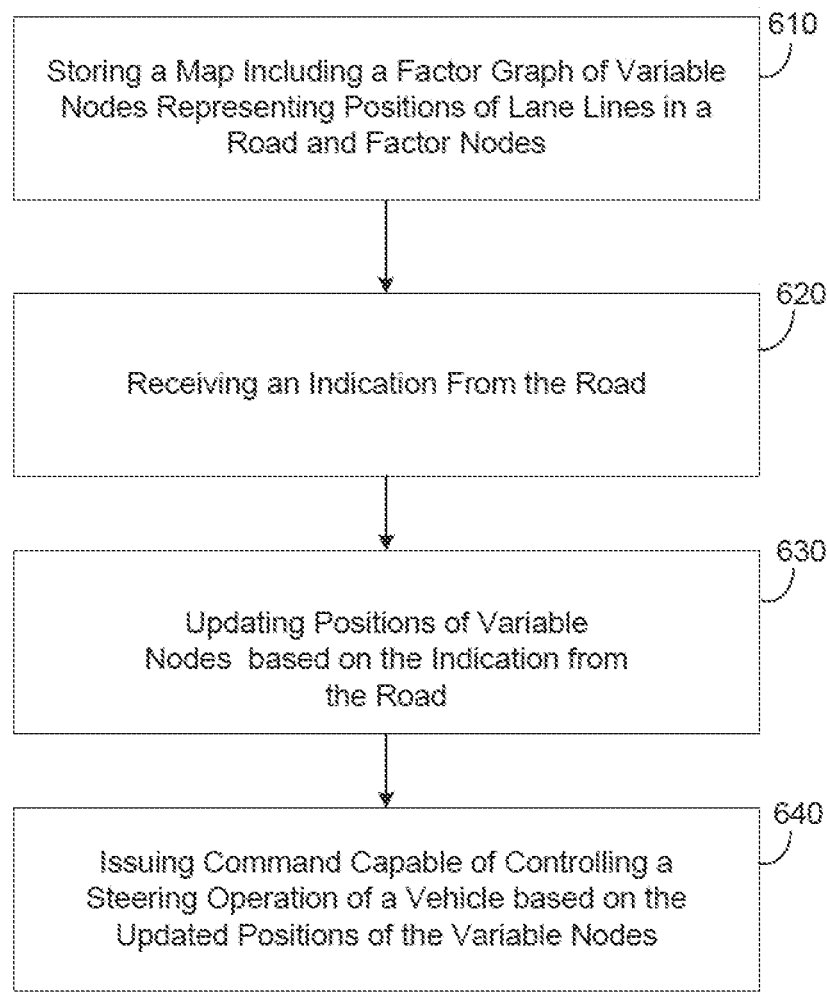
FIG. 6 is a diagram illustrating a method for updating a computer vision map of a vehicle in accordance with an example embodiment.

FIG. 6 illustrates a method 600 for updating a computer vision map of a vehicle in accordance with an example embodiment. As an example, the method 600 may be performed by a computer installed within a vehicle. As another example, the method 600 may be performed by a remote server that is in communication with the computer installed within the vehicle. Referring to FIG. 6, in 610, the method may include storing a map which is associated with a factor graph of variable nodes representing a plurality of constraints that define positions of lane lines in a road and factor nodes between the variable nodes on the factor graph which define positioning constraints amongst the nodes. Initially, the positions/locations of the nodes on the map may be set by default. Over time, the positions/locations of the variable nodes on the map may be modified based on transforms/factor nodes that are stored within the factor graph.

In 620, the method may include receiving an indication from the road using a sensor of a vehicle. For example, the indication may be an image or other sensor reading such as lidar or radar that may be captured by a camera or other sensor that is attached to the vehicle. The indication may indicate an actual position of the lane line while the vehicle is on the road. In 630, the method may include updating positions of the variable nodes in the map based on the indication from the road and an estimated location of the vehicle within the map. In other words, a position of a variable node (or multiple nodes) within the map may be moved by the vehicle in real-time to correct lane line misalignment detected between the map and the images of the lane lines, while travelling. In 640, the method may include issuing commands that are capable of controlling a steering operation of the vehicle based on the updated positions of the variable nodes in the map. For example, the commands may include an autonomous vehicle operation performed without a human such as a turning operation, a lane change operation, a passing operation, a slow-down operation, a pull over operation, and the like.

In some embodiments, the updating may include detecting that a lane line in the image of the road is not aligned with a corresponding variable node in the map, and moving a position of the corresponding variable node in the map based on a position of the lane line in the image. In some embodiments, the updating may further include moving positions of one or more adjacent variable nodes in the map based on factor nodes in the factor graph between the corresponding variable node and the one or more nearby variable nodes, respectively. In some embodiments, the updating of the positions of the variable nodes in the map is based on global position information that is stored with the factor nodes in the factor graph.

In some embodiments, the storing may include storing the map including the factor graph of nodes within an executable file installed within a computer of the vehicle. In some embodiments, the controlling may include controlling the vehicle to perform one or more of a lane change, a change of speed, and a turn, based on the updated positions of the variable nodes in the map. In some embodiments, the updating may include iteratively capturing images of the plurality of lane lines at predetermined intervals while the vehicle is moving along the road, wherein each image corresponds to a different subset of variable nodes on the map than a previous image. In some embodiments, the updating may include iteratively adding factor nodes representing camera/map line error and iteratively updating positions of the variable-nodes in order to minimize the error of nodes within the map based on the iteratively captured images.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory configured to store a map representing a plurality of lane lines of a road as a graph, the graph including a plurality of variable nodes each associated with a position in the map and interconnected via edges that model positions of the lane lines of the road in the map, and the graph further including a plurality of factor nodes positioned on the edges between adjacent variable nodes and storing relative positioning constraints that limit positions of respective adjacent variable nodes; and
a processor configured to:
receive sensor data of the road captured by at least one sensor of a vehicle as the vehicle is moving with respect to the road:
determine, as the vehicle is moving on the road, updated positions for at least one of the variable nodes within the map based on the received sensor data and further based on the positioning constraints defined for the at least one of the variable nodes by the plurality of the factor nodes;
store the map including the updated positions for at least one of the variable nodes in the memory; and control movement of the vehicle with respect to the road based on the updated positions of the at least one of the variable nodes within the map of the road.

2. The computing system of claim 1, wherein the processor is configured to detect that the lane line is misaligned based on an image of the lane line compared to positions of a one or more of the variable nodes in the map of the road.

3. The computing system of claim 1, wherein the at least one of the variable nodes is associated with a global position factor, and the processor is configured to determine updated positions for the at least one of the variable nodes within the map by using the sensor data to modify the global position factor associated with the at least one of the variable nodes stored in the graph.

4. The computing system of claim 1, wherein the memory is configured to store the map of the road within a computer-readable file.

5. The computing system of claim 1, wherein the processor is configured to control the vehicle to perform one or more of a lane change, a change of speed, and a turn, based on the updated positions of the at least one of the variable nodes within the map of the road.

6. The computing system of claim 1, wherein the processor is configured to iteratively capture indications of the lane lines at predetermined intervals while the vehicle is moving along the road, wherein each indication corresponds to a different subset portion of the plurality of the variable nodes in the map of the road than a previous indication.

7. The computing system of claim 6, wherein the processor is configured to iteratively update positions of one or more of the variable nodes within the map of the road based on the iteratively captured indications.

8. The computing system of claim 1, wherein the processor is configured to store the map including the updated positions for the at least one of the variable nodes within the map of the road while the vehicle is moving along the road.

9. A method comprising:
storing a map representing a plurality of lane lines of a road as a graph, the graph including a plurality of a variable nodes each associated with a position in the map and interconnected via edges that model positions of the lane lines of the road in the map, and the graph further including a plurality of factor nodes positioned on the edges between adjacent variable nodes and storing relative positioning constraints that limit positions of respective adjacent variable nodes;
receiving sensor data of the road captured by at least one sensor of a vehicle as the vehicle is moving with respect to the road;
determining, as the vehicle is moving on the road, updated positions for at least one of the variable nodes within the map based on the received sensor data and further based on the positioning constraints defined for the at least one of the variable nodes by the plurality of the factor nodes;
storing the map including the updated positions for the at least one of the variable nodes in a memory; and
controlling movement of the vehicle with respect to the road based on the updated positions of the at least one of the variable nodes within the map of road.

10. The method of claim 9, wherein the updating comprises detecting that the lane line is misaligned based on an image of the lane line compared to positions of a one or more of the variable nodes in the map of the road.

11. The method of claim 9, wherein the at least one of the variable nodes is associated with a global position factor, and the determining of the updated positions for the at least one of the variable nodes is based on within the map comprises using the sensor data to modify the global position factor associated with the at least one of the variable nodes that is stored in the graph.

12. The method of claim 9, wherein the storing comprises storing the map of the road within a computer-readable file.

13. The method of claim 9, wherein the controlling comprises controlling the vehicle to perform one or more of a lane change, a change of speed, and a turn, based on the updated positions of the at least one of the variable nodes within the map of the road.

14. The method of claim 9, wherein the updating comprises iteratively capturing indications of the lane lines at predetermined intervals while the vehicle is moving along the road, wherein each indication corresponds to a different portion of the plurality of the variable nodes in the map of the road than a previous indication.

15. The method of claim 14, wherein the updating comprises iteratively updating positions of one or more of the variable nodes within the map of the road based on the iteratively captured indications.

16. The method of claim 9, wherein the updating comprises storing the map including the updated positions for the at least one of the variable nodes within the map of the road while the vehicle is moving along the road.

17. A vehicle comprising:
a memory configured to store a map representing a plurality of lane lines of a road as a graph, the graph including a plurality of a variable nodes each associated with a position in the map and interconnected via edges that model positions of the lane lines of the road in the map, and the graph further including a plurality of factor nodes positioned on the edges between adjacent variable nodes and storing relative positioning constraints that limit positions of respective adjacent variable nodes; and
a processor configured to:
receive sensor data captured of the road as a vehicle moves along the road;
determine, as the vehicle is moving on the road, updated positions for at least one of the variable nodes within the map based on the received sensor data and further based on the positioning constraints defined for the at least one of the variable nodes by the plurality of the factor nodes;
store the map including the updated positions for the at least one of the variable nodes in the memory; and
control movement of the vehicle with respect to the road based on the updated positions of the at least one of the variable nodes within the map of the road.

18. The vehicle of claim 17, wherein the processor is configured to detect that the lane line is misaligned based on an image of the lane line compared to positions of one or more of the variable nodes in the map of the road.

* * * * *